United States Patent [19]

Crano et al.

[11] 4,440,909

[45] * Apr. 3, 1984

[54] BLENDS OF BIS(ALLYL CARBONATE) MONOMERS WITH POLYMERS AND POLYMER BLENDS PRODUCED THEREFROM

[75] Inventors: John C. Crano; Ronald L. Haynes, both of Akron, Ohio

[73] Assignee: PPG Industries, Inc., Pittsburgh, Pa.

[*] Notice: The portion of the term of this patent subsequent to Aug. 24, 1999 has been disclaimed.

[21] Appl. No.: 343,122

[22] Filed: Jan. 27, 1982

Related U.S. Application Data

[63] Continuation of Ser. No. 219,063, Dec. 22, 1980, Pat. No. 4,346,197.

[51] Int. Cl.$^3$ .............................................. C08L 47/00
[52] U.S. Cl. ..................................... 525/277; 264/2.6; 264/176 R; 264/176 F; 264/209.6; 264/319; 264/328.2; 264/331.13; 264/347; 525/198; 525/220; 525/224
[58] Field of Search .......................................... 525/277

[56] References Cited

U.S. PATENT DOCUMENTS

| | | | |
|---|---|---|---|
| 2,384,123 | 9/1945 | Muskat et al. | 260/78 |
| 2,468,975 | 5/1949 | Held et al. | 525/277 |
| 2,568,658 | 9/1951 | Pope | 260/77.5 |
| 3,013,305 | 12/1961 | DeGooreynd | 18/47.5 |
| 3,872,042 | 3/1975 | Bond | 260/23 |
| 3,995,015 | 5/1976 | Ohtsuka et al. | 427/163 |
| 4,217,433 | 8/1980 | Dyball | 525/277 |
| 4,346,197 | 8/1982 | Crano et al. | 525/277 |

*Primary Examiner*—Stanford M. Levin
*Attorney, Agent, or Firm*—Richard M. Goldman

[57] ABSTRACT

Disclosed are polymer blends of bis(allyl carbonate) polymers with polymers of olefinically unsaturated monomers, and the precursor blends of bis(allyl carbonate) monomers with polymers of olefinically unsaturated monomers, and fabricable resins prepared therefrom. Also disclosed is a method of fabricating, e.g., molding, injection molding, extruding, and the like, the fabricable resins. The bis(allyl carbonate) polymer blend is taken to a fabricable state, i.e., a fusible pseudoplastic that does not lose liquid on fabrication, either by admixture or admixture and reaction. The fabricable resin is then fabricated, e.g., extruded, molded, or the like, and then polymerized to a hard polymer. Also disclosed are blends of bis(allyl carbonates), monomeric and polymeric, with polymers having olefinic unsaturation.

7 Claims, No Drawings

BLENDS OF BIS(ALLYL CARBONATE) MONOMERS WITH POLYMERS AND POLYMER BLENDS PRODUCED THEREFROM

This is a continuation of application Ser. No. 219,063, filed Dec. 22, 1980, U.S. Pat. No. 4,346,197.

DESCRIPTION OF THE INVENTION

Bis(allyl carbonate) monomers yield hard resin polymers having superior optical properties. However, the full utilization of these materials has been limited because only mold casting has been hitherto found to yield useful articles.

Mold casting is a time consuming process, yielding products of relatively simple geometry. Moreover, mold casting requires large numbers of individual casting molds.

It has now been found that bis(allyl carbonate) monomer containing a polymer possesses properties of fabricability during a narrow interval in the course of polymerization. It has been found that in this narrow interval, the polymerizate may be comminuted and thereafter fused. It has further been found that in this interval the polymerizate, when compressed, does not expel, lose, or ooze liquid. It has moreover been found that in this interval, the polymerizate may be formed into complex shapes without fracturing.

According to the method of this invention, bis(allyl carbonate) monomer in admixture with a compatible polymer may be worked, as by extrusion, molding, or the like, and thereafter polymerized or further polymerized to yield a hard resin.

According to a still further exemplification of this invention there is provided a polymeric system, i.e., a system having characteristics of a copolymer and of a polymer blend, by polymerizing a bis(allyl carbonate) in the presence of a second polymer having sites of olefinic unsaturation.

DETAILED DESCRIPTION OF THE INVENTION

According to one exemplification of the invention herein contemplated, the polymerization of bis(allyl carbonate) monomers in admixture with a polymer, e.g., to form a polymer blend, may be postponed or interrupted to recover a fabricable, workable, pseudoplastic resin, polymerizate, or intermediate. This pseudoplastic resin can be worked, e.g., as described hereinbelow, and polymerization continued either simultaneously with working or subsequently thereto.

By a fabricable, workable, or pseudoplastic polymer is meant a bis(allyl carbonate) material that softens and flows upon application of heat or pressure or heat and pressure, is processable, fusible, extrudable, injection moldable, transfer moldable, and the like, and exhibits rheological properties associated with pseudoplastic and thermoplastic properties. By pseudoplastic properties are meant that the log shear stress versus log shear rate is, at constant temperature, a smooth, increasing function, with shear stresses of $10^3$ to $10^7$ dynes per square centimeter producing shear rates of 10 to 10,000 per second.

The interval when the bis(allyl carbonate)-polymer blend is pseudoplastic occurs after the viscosity has begun to increase, e.g., due to either the addition of the compatible polymer or to polymerization, but before a rigid polymerizate is formed. During the interval of fabricability, the extent or degree of polymerization, or completion of reaction is high enough, or the physical structure of the blend is such, whereby to avoid driving off, expelling, or oozing liquid during working, but low enough to retain fusibility of the polymerizate. The interval of fabricability may be found by routine experimentation.

It is believed that a homomonomer-polymer blend system containing a polymer dissolved in or swollen by and containing bis(allyl carbonate) monomer yields an interpenetrating network of two polymers. It is believed that the polymerization of the bis(allyl carbonate) with the swollen or solubilized polymer favors a wider range of degree or extent of total polymer containing in which the polymerizate is workable, fabricable, or thermoplastic than a bis(allyl carbonate) homomonomer-homopolymer.

According to a method of this invention, a composition is prepared containing bis(allyl carbonate) monomer, and a polymer. The polymerization, if any, to yield a fabricable polymer, is commenced by the addition of an initiator, e.g., a peroxy initiator, and heating the liquid composition. If the reaction is not interrupted, the reaction ultimately yields a hard resin. However, over a measurable range of extent of reaction or degree of polymerization, beginning for some bis(allyl carbonate)—polymer systems as low as no bis(allyl carbonate) polymerization, and for other systems after several minutes to several hours of reaction, the reaction mixture is workable, fabricable, or pseudoplastic. Prior to fabricability, the reaction mixture oozes liquid when worked, while subsequent to fabricability the reaction mixture is not fusible. The time require to attain fabricability is a function of the temperature, the free radical polymerization initiator, the concentration of the free radical polymerization initiator, the polymer, and the concentration of the polymer. For a composition containing a bis(allyl carbonate) as a monomer, 20 weight percent 100,000 molecular weight poly(methyl methacrylate), and 3 weight percent benzoyl peroxide, based on monomer, the time for the onset of fabricability is from about 120 minutes at 60 degrees Centigrade to about 10 hours at 40 degrees Centigrade. For lesser amounts of benzoyl peroxide, the time to attain fabricability is longer, while for greater amounts, the time is shorter. As used herein, the terms "working" and "fabrication" are synonymous with and refer to processes including mixing the viscous, pseudoplastic resins; milling the viscous, pseudoplastic resins; comminuting the pseudo-plastic resins; blending the comminutes of the pseudoplastic resins; extrusion of the pseudoplastic resins; forming of film, sheetings, and tubing of the pseudoplastic resins; calendering of the pseudoplastic resins; fiber spinning, filament spinning, and melt spinning of the pseudoplastic resins; laminating the pseudoplastic resins, e.g., as a film, sheet, layer, coating, or substrate; molding of the pseudoplastic resins, e.g., compression molding, injection molding, casting, blow molding, transfer molding and stamping; foaming of the pseudoplastic resins; and sheet forming of the pseudoplastic resins.

According to one exemplification, the resins herein contemplated may be formed by combining bis(allyl carbonate) monomer with a compatible polymer to yield a fabricable resin without polymerization. Alternatively, the admixture thereof may be partially polymerized to yield a fabricable resin. By a fabricable resin is meant a resin having a shear stress of $10^3$ to $10^7$ dynes per square container at a shear rate of 10 to $10^4$ per second.

According to an alternate exemplification, the fabricable resins herein contemplated, formed either upon mixing or upon subsequent polymerization to a fabricable state, may be extruded. The feed to the extruder may be particles, pellets, or other comminutes of the fabricable resin. Alternatively, the feed may be a continuous ribbon of fabricable resin. The fabricable resin is carried through the extruder to die means by conveyor means, e.g., a screw conveyor. The viscous flow of resin through the extruder heats the resin. As the heating may be sufficient to cause further polymerization within the extruder, it may be necessary to cool the extruder whereby to avoid curing and hardening within the extruder.

The die means may be a tee shaped die, whereby to form film or sheet. The film or sheet may be drawn up on a roller, either with or without thinning, with subsequent curing. For example, a section of film or sheet may be cut, or molded, or shaped, or flattened, or the like, and thereafter cured to form a hard resin.

Alternatively, the die means may be ring shaped, with a mandrel therein, whereby to form a tube. Additionally, an air bubble may be introduced, whereby the tube or sleeve of resin is formed around the air bubble, the air bubble, once formed, acting like a shaping mandrel. According to this exemplification, the tube or sleeve of fabricable material may thereafter be cured to yield a hard resin tube.

According to a further alternative exemplification, the fabricable resin may be extruded through a filament or fiber forming die, e.g., a spinneret having a plurality of holes, or a slot die. As herein contemplated, the fabricable resin may be fed to the spinneret by a screw extruder or a gear pump. The feed of fabricable resin may be substantially free of solvents, containing mainly resin, as in melt spinning. Alternatively, the resin feed may contain solvent, which solvent evaporates during, or after, or during and after fiber formation, as in dry spinning.

According to a further exemplification herein contemplated, the fabricable resin may be used to form a laminate. For example, a laminate may be formed of two sheets of fabricable resin, with subsequent chemical reaction, i.e., polymerization, forming a bond therebetween. Alternatively, a laminate may be formed of one sheet of the fabricable resin, and one sheet of another material, the sheet of fabricable resin bonding to the other material upon subsequent curing.

According to a further exemplification herein contemplated, the fabricable resin may be compression molded, e.g., by a sequence of pressurized flow, molding, and reaction. As herein contemplated, the viscous, fabricable resin is forced into a cavity or mold, and maintained in the mold under conditions where further cure, e.g., cross linking, may occur.

In one exemplification, a thin sheet, section, or biscuit of fabricable resin may be molded in a flash mold molding press, the faces of which are negative of the desired product. The sheet, section, or biscuit is heated in the mold, i.e., to cure the fabricable resin, with simultaneous compression, e.g., up to 200 pounds per square inch, or higher, for example, up to 3000 pounds per square inch. In this way, video discs, records, laser readable computer memory discs, diffraction gratings, fresnel lenses, optical lenses, and the like may be prepared.

According to a further alternative exemplification, the fabricable resin of this invention may be injection molded. As herein contemplated, injection means, e.g., a piston, ram, plunger, screw or reciprocating screw, drives the resin through a cylinder, a nozzle at the end of the cylinder, a sprue bushing, a gate, and a runner into a molding cavity. The resin may be introduced into the cylinder as a ribbon, stream, or comminute. The driving of the viscous resin by the piston, ram, plunger, screw, or reciprocating screw converts mechanical energy into thermal energy, adiabatically heating the polymerizate. It may therefore be necessary to cool the cylinder whereby to avoid curing, cross linking, or polymerization within the cylinder. After curing in the cavity, e.g., partial curing or even complete curing, the finished casting is ejected from the cavity. In this way lenses may be injection molded to shape.

According to a still further exemplification, the fabricable resin may be transfer cast, i.e., transferred into a mold and allowed to cure.

The above methods of fabricating the fabricable resin may be combined. For example, fabricable resin may be comminuted, mixed, and thereafter extruded to a sheet or film, or molded.

According to a further exemplification, the fabricable resin may be utilized as an adhesive. For example, fabricble resin as a ribbon, film comminute, particulate, or sheet, may be placed between two objects, e.g., two lenses, and cured or cured and compressed, whereby to cause the objects to adhere together.

After working the fabricable resin, the fabricable resin is cured to yield polymerizate, i.e., a hard resin. By a hard resin is meant a resin having a Rockwell hardness of greater than M100, a tensile strength of at least about 5000 pounds per square inch, a flexural strength of at least about 8000 pounds per square inch, a flexural modulus at 100,000 pounds per square inch of at least about 2.5, a compressive strength of at least about 20,000 pounds per square inch, a compressive strength modulus at 100,000 pounds per square inch of at least about 2.5, a Notched Izod Impact strength of at least about 0.2 foot-pounds per square inch, and an unnotched Izod Impact Strength of at least about 1.5 foot-pounds per square inch.

The curing may be carried out by heating the worked, fabricable resin. The heating is typically to above about 80° Centigrade, e.g., to about 100° Centigrade or even 110° Centigrade. The time required to attain a temperature above about 80° Centigrade should be fast enough to provide economical use of equipment, but slow enough to avoid gas bubble formation, cracking, and discoloration of the resulting polymerizate. The time required to attain a temperature above about 80° Centigrade is dependent upon the initiator, the amount of initiator, and previous extent of cure. Generally, the cumulative amount of cure, i.e., from initial polymerization, if any, of the monomeric bis(allyl carbonate) to the recovery of the fabricable resin, and the final cure of the fabricable resin after working, is about one to twenty hours when the initiator is benzoyl peroxide, and it is present in the original monomer at about 3.0 weight percent.

While the final cure may be carried out in a water bath or in an oven, it may also be commenced during working, i.e., by extruding the fabricable polymerizate over heated rollers, or injecting the heated polymerizate into a heated mold.

Alternatively, the final cure may be carried out by ultrasonic heating or microwave heating.

Bis(allyl carbonate) monomers which may be polymerized by the method of this invention are normally linear, liquid allyl carbonates, i.e., glycol bis(allyl carbonate) compounds, in which the allyl groups may be substituted at the 2 position with a halogen, notably bis(2-bromoallyl carbonate), dipropylene glycol bis(allyl carbonate), trimethylene glycol bis(2-ethylallyl carbonate), and pentamethylene glycol bis(allyl carbonate).

Commercially important bis(allyl carbonate) monomers which may be polymerized by the method herein contemplated are:

$$CH_2=CH-CH_2-O-\overset{O}{\underset{\|}{C}}-O-CH_2-CH_2-O-CH_2CH_2-O-CH_2CH_2-O-\overset{O}{\underset{\|}{C}}-O-CH_2-CH=CH_2,$$

$$CH_2=CH-CH_2-O-\overset{O}{\underset{\|}{C}}-O-CH_2CH_2-O-CH_2CH_2-O-\overset{O}{\underset{\|}{C}}-OCH_2-CH=CH_2$$

and $$CH_2=CH-CH_2-O-\overset{O}{\underset{\|}{C}}-O-CH_2-CH_2-O-\overset{O}{\underset{\|}{C}}-O-CH_2-CH=CH_2,$$

chlorine or bromine, or a 1 to 4 carbon alkyl group, generally a methyl or ethyl group, and the glycol group may be an alkylene, alkylene ether, or alkylene polyether group having from 2 to 10 carbons and oxygens. These bis(allyl carbonate) monomers are represented by the formula:

$$R_1-O-\overset{O}{\underset{\|}{C}}-O-R_2-O-\overset{O}{\underset{\|}{C}}-O-R_3$$

where $R_1$ and $R_3$ are allyl or substituted allyl groups, and $R_2$ is as defined below. $R_1$ and $R_3$ are independently represented by the formula:

$$H_2C=\underset{\underset{R^1}{|}}{C}-CH_2-$$

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluorallyl, 2-methyallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$, alkylene polyether groups such as $-CH_2-CH_2-O-CH_2CH_2-O-CH_2CH_2O-CH_2CH_2-$ and $-CH_2-O-CH_2-$ groups and alkylene carbonate groups such as $CH_2CH_2-O-CO-O-CH_2CH_2$ and $-CH_2CH_2-O-CH_2CH_2-O-CO-O-CH_2CH_2-OCH_2CH_2-$ groups. Most commonly, $R_2$ is $-CH_2CH_2-$ or $CH_2CH_2-O-CH_2CH_2-$.

Specific examples of bis(allyl carbonate) monomers useful in carrying out the method herein contemplated include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol As herein contemplated, the pseudoplastic resin is prepared from a composition of bis(allyl carbonate) and a polymer. The polymer is either soluble in the bis(allyl carbonate), swollen by the bis(allyl carbonate), or swollen by and partially soluble in the bis(allyl carbonate). The polymer should both be resistant to destruction by the peroxy initiators used to polymerize the bis(allyl carbonate), and not interfere therewith.

As herein contemplated, the polymer may be a monofunctional homopolymer, or a copolymer of monofunctional monomers, or a copolymer of a monofunctional monomer and a difunctional monomer. Preferably the difunctional monomer has functional groups of high and low reactivity, e.g., a vinyl group and an allyl group, and the monofunctional monomer is a vinyl monomer.

Preferably the copolymer is a copolymer of (a) an acrylate, i.e., an acrylate ester or an acrylic acid, and (b) an ester of an acrylic acid and an allyl alcohol or substituted allyl alcohol having the formula:

$$+R_5)\quad (R_6)\quad \text{where } R_5-\overset{O}{\underset{\|}{C}}-OH \text{ and } R_6-\overset{O}{\underset{\|}{C}}OH$$
$$\underset{\underset{\underset{R_4}{|}}{\underset{|}{O}}}{\underset{|}{C=O}}$$

independently are acrylic acids, as acrylic acid, methacrylic acid, ethyl acrylic acid, butyl acrylic acid, propyl acrylic acid, and higher acrylic acids; and $R_4OH$ is an allyl alcohol or substituted allyl alcohol, having the formula $$H_2C=\underset{\underset{R^4}{|}}{C}-CH_2-OH$$

where $R^4$ is chosen from the group consisting of hydrogen, halogen, and $C^1$ to $C^4$ alkyls. Most frequently $R_4OH$ is allyl alcohol, $$H_2C=CH-CH_2OH, R_5\overset{O}{\underset{\|}{C}}OH \text{ and } R_6\overset{O}{\underset{\|}{C}}OH$$

are independently either acrylic acid,

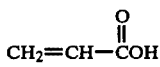

or methacrylic acid

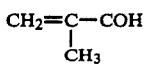

For example, the difunctional monomer may be allyl acrylate, allyl methacrylate, or the like, and the monofunctional monomer may be methyl acrylate, methyl methacrylate, ethyl acrylate, ethyl methacrylate, or the like. In this way there is provided a linear, minimally cross linked, soluble, swellable polymer, with polymerization predominantly through the vinyl groups. Especially preferred is a copolymer of allyl methacrylate and methyl methacrylate.

One particularly desirable copolymer is a copolymer of methyl methacrylate and allyl methacrylate. The copolymer typically contains from about 80 to about 99 weight percent methyl methacrylate and balance allyl methacrylate. Especially preferred is a copolymer containing up to 95 weight percent methyl methacrylate, balance allyl methacrylate, and an apparent molecular weight of 100,000 to 600,000 determined by inherent viscosity versus poly(methyl methacrylate).

Especially preferred copolymers with olefinic unsaturation, ie, copolymers of an acrylate and an allyl acrylate, are those having a macromolecule molecular weight above about 100,000, and especially from about 100,000 to about 600,000. These copolymers are characterized by a low rate of solubilization in and swelling by the bis(allyl carbonate) monomer. As a consequence, in order to obtain high levels thereof in the final polymerizate, e.g., above about 8 to 15 weight percent, they are usually first solubilized in or swollen by a suitable solvent, e.g., methylene chloride, and thereafter admixed with bis(allyl carbonate) and the solvent subsequently recovered therefrom.

Alternatively, the polymer may be a polymer of a mono-olefine, i.e., poly(styrene), poly(acrylonitrile), poly(vinyl chloride), poly(vinylidene chloride), poly(vinyl fluoride), poly(vinylidene fluoride), poly(vinyl acetate), poly(acrylic acid), poly(methacrylic acid), poly(methyl acrylate), poly(ethyl acrylate), poly(butyl acrylate), poly(methyl methacrylate), poly(ethyl methacrylate), poly(butyl methacrylate), poly(acrylamide), poly(ethylene), poly(propylene), and copolymers thereof. Alternatively, the polymer may be a heterochain polymer, i.e., a condensation polymer. Suitable heterochain polymers include saturated polyesters such as terephthalates, e.g., polyethylene terephthalate, and polycarbonates; polyethers, such as polyacetal, poly(ethylene oxide), poly(propylene oxide), poly(epichlorohydrin), poly(epichlorohydrin-ethylene oxide), poly(tetrahydrofuran); or polyamides or polyimides.

Where the end use of the polymerizate requires optical clarity and refraction, polymers that do not materially interfere therewith are preferred. These polymers include poly(styrene), poly(acrylic acid), poly(methacrylic acid), poly(methyl acrylate), poly(ethyl acrylate), poly(butyl acrylate), poly(methyl methacrylate), poly(ethyl methacrylate), poly(butyl methacrylate), poly(vinyl acetate), poly(allyl methacrylate-methyl methacrylate), poly(allyl acrylate-methyl acrylate), poly(allyl acrylatemethyl methacrylate), and poly(allyl acrylate-ethyl acrylate).

The properties of the pseudoplastic resin and of the resulting hard polymerizate are functions of the polymer and of the concentration thereof. For example, at concentrations below about 25 weight percent, poly(methyl methacrylate) of molecular weight approximately 500,000, the system of diethylene glycol bis(allyl carbonate)-poly(methyl methacrylate) requires partial cure to yield a fabricable resin, while at concentrations above about 30 weight percent poly(methyl methacrylate) of molecular weight of approximately 500,000, the system of diethylene glycol bis(allyl carbonate)-poly(methyl methacrylate) is pseudoplastic upon formation, without cure.

The polymer may be added directly to the bis(allyl carbonate) monomer. Alternatively, the polymer may be added to an organic solvent, e.g., methylene chloride, whereby to form a solution. Thereafter, the bis(allyl carbonate) monomer is added to the solution, and the solvent driven off, e.g., by distillation, evaporation, boiling, or the like.

According to a preferred exemplification, i.e., where the polymer is a high molecular weight copolymer having olefinic unsaturation, as described hereinabove, e.g., a copolymer of a first monomer having allyl and vinyl unsaturation and a second monomer having vinyl unsaturation and a macromolecule molecular weight above about 100,000 in order to obtain high levels of the copolymer, i.e., above about 8 to 15 weight percent, the macromolecule is first dissolved in a solvent. Especially preferred are those solvents having a solubility parameter of about 9.0 to about 10.0 (calories/cubic centimeter)$^{-0.5}$, where the solubility parameter is the square root of the cohesive density, as described in F. Rodriquez, Principles of Polymer Systems, McGraw-Hill Book Co., New York, N.Y., (1970), and Beerbower, Kaye, and Pattison, Chem. Engr., Dec. 18, 1967, page 118.

Exemplary solvents include halogenated hydrocarbons, such as methylene chloride, chloroform, dichloroethylene, ethylene dichloride, tetrachloroethane, tetrachloroethylene, trichloroethane, trichloroethylene, aromatics, such as benzene, nitrobenzene, orthodichlorobenzene, styrene, and chlorobenzene, and hydrocarbons. Alternatively, other solvents, such as benzaldehyde, carbon disulfide, chlorobromomethane, cyclohexanone, ethyl chloroformate, diethylene glycol, diphenyl, turpentine, cyclohexane, isoctane, and nitrobenzene may be used.

The amount of solvent is generally from about one to about twenty-five times the weight of polymer, and generally from about four to about twenty times.

The polymerization of the bis(allyl carbonate), e.g., to yield the first, pseudoplastic resin, and to thereafter yield the rigid polymerizate, i.e., the hard resin polymerizate, is initiated by the creation of active centers, e.g., free radicals, carbanions, and carbonium ions. Useful free radical initiators are peroxy initiators. The peroxy initiators include: isobutyryl peroxide; di(2-ethylhexyl)peroxydicarbonate; acetyl cyclohexane sulfonyl peroxide; di(sec-butyl)peroxydicarbonate; diisopropyl peroxydicarbonate; 2,4-dichlorobenzoyl peroxide; t-butyl peroxypivalate; decanoyl peroxide; lauroyl peroxide; propionyl peroxide; 2,5-dimethyl-2,5-bis(2-ethyl hexylperoxy)hexane; acetyl peroxide; succinic acid peroxide; t-butyl peroxyoctoate; benzoyl peroxide; p-chlorobenzoyl peroxide; t-butyl peroxyisobutyrate;

t-butyl peroxymaleic acid; bis(1-hydroxycyclohexyl)-peroxide, 1-hydroxy-1'-hydroperoxy dicyclohexyl peroxide; t-butyl peroxyisopropyl carbonate; 2,5-dimethyl-2,5-bis(benzoylperoxy)hexane; t-butyl peroxyacetate; methyl ethyl ketone peroxides; di-t-butyl diperoxyphthalate and t-butyl peroxybenzoate.

Especially preferred peroxy initiators are those that do not discolor, char, or burn the resulting polymerizate. Exemplary are diisopropyl peroxydicarbonate and benzoyl peroxide.

According to one preferred embodiment, poly(methyl acrylate) is dissolved in methylene chloride. The composition is agitated until it is clear. Thereafter it is fed to a reactor and diisopropyl peroxydicarbonate is added to the composition. Diethylene glycol bis(allyl carbonate) is then added to the reactor to provide a solution that is 15 weight percent poly(methyl acrylate), balance diethylene glycol bis(allyl carbonate), basis total poly(methyl acrylate) and diethylene glycol bis(allyl carbonate). The composition is stripped to drive off and recover the methylene chloride. The composition is then heated to 40° Centigrade and maintained thereat for about 45 minutes, whereby to form a fabricable pseudoplastic polymerizate.

The fabricable polymerizate is placed in a compression mold and compressed to 2,000 pounds per square inch for 60 minutes, at about 60 degrees Centigrade. Thereafter, a hard cured sheet is recovered.

Higher or lower amounts of polymer could have been used, polymers other than poly(methyl acrylate) could have been used, and solvents other than methylene chloride could have been used.

According to a still further embodiment, a polymer containing 85 to 95 weight percent methyl methacrylate, balance allyl methacrylate, and having an apparent molecular weight of 400,000 to 600,000 by inherent viscosity versus polymethyl methacrylate, is prepared. The copolymer is added to methylene chloride to yield a 8 to 25 weight percent solution of the copolymer in methylene chloride.

Diethylene glycol bis(allyl carbonate) is added to the methylene chloride-poly(methyl methacrylate-allyl methacrylate) solution to produce a solution containing 70 percent diethylene glycol bis(allyl carbonate), basis total diethylene glycol bis(allyl carbonate) and poly(methyl methacrylate-allyl methacrylate). Benzoyl peroxide is added to the composition. The methylene chloride is boiled off. The polymerization is carried out to yield a fabricable pseudoplastic resin.

The fabricable resin is fed through an injection molder to a planoconcave lens mold and heated to about 80° to 110° Centigrade over a period of 16 to 24 hours to yield a hard resin lens.

The following Examples are illustrative of the method of this invention.

EXAMPLE I

A resin of diethylene glycol bis(allyl carbonate) and poly(methyl methacrylate) was prepared, compressed, and cured to yield a rigid polymer.

A polymer composition was prepared by dissolving 46.6 grams Rohm and Haas Co. Crystal 100, Type 811 Plexiglas ® pellets of poly(methyl methacrylate) in 150 milliliters of methylene chloride. After the solution cleared, it was added to 50.2 grams of PPG Industries, Inc. CR-39 ® brand diethylene glycol bis(allyl carbonate), 50 milliliters of methylene chloride, and 1.5 grams of benzoyl peroxide initiator.

The composition was poured into a crystalizing dish, and maintained under vacuum at a temperature of about 50 degrees Centigrade for two hours. The plastic product was chopped, heated to about degrees Centigrade for one hour, and allowed to stand at 20 degrees Centigrade for 16 hours.

The resulting product was observed to be a clear, colorless plastic, thermoplastic in the temperature range of 20 degrees Centigrade to 50 degrees Centigrade. The product supported its own weight, was highly viscous, and did not ooze liquid.

The thermoplastic resin was placed between two chromed steel plates, compressed at 300 pounds per square inch pressure, in a hydraulic press, at a temperature of 80 to 90 degrees Centigrade for a few minutes, and removed from the steel plate. The resin was pressed between two tempered glass plates held in compression with a steel clip, and heated to a temperature of about 105 degrees Centigrade over a period of about 20 hours.

Thereafter, a sheet of rigid resin was recovered.

The rigid resin had a Bar-Col hardness of 41-37.

EXAMPLE II

A resin of diethylene glycol bis(allyl carbonate) and a copolymer of allyl methacrylate and methyl methacrylate was prepared, and cured to yield a rigid polymer.

The copolymer of allyl methacrylate and methacrylate was prepared by placing 5 grams of allyl methacrylate, 95 grams of methyl methacrylate, 300 milliliters of methylene chloride, and 1.0 gram of isopropyl peroxydicarbonate in a 28 ounce round bottle. The bottle was sealed. The bottle was then heated at 50 degrees Centigrade in a water bath for 18 hours. The bottle was then removed from the water bath, and the polymer isolated by extraction with methanol to precipitate polymer. The polymer was then dried under vacuum. Thereafter, the molecular weight was determined by inherent viscosity in methylene chloride versus poly(methyl methacrylate), and was found to be in excess of 500,000.

The copolymer was ground in a mortar and pestle. The ground copolymer was slowly added to 283 grams of PPG Industries, Inc. Cr-39 ® brand diethylene glycol bis(allyl carbonate) in a 1.5 liter stainless steel beaker. The beaker was heated with an electric heating jacket, and the composition was agitated with a Dispersator ® high energy mixer with a 3 inch Cowles blade. Over a period of six and one half hours, at a temperature of 80 to 95 degrees Centigrade, 45.6 grams of the poly(allyl acrylate-methyl methacrylate) copolymer was added to the diethylene glycol bis(allyl carbonate).

The resulting composition was a highly viscous composition containing 13.7 weight percent of a poly(allyl methacrylate-methyl methacrylate) copolymer containing approximately 5 weight percent allyl methacrylate, balance methyl methacrylate.

Initiator was added to the composition by first heating to 55 degrees Centigrade, and adding 8.4 grams of benzoyl peroxide to the composition while agitating with a Dispersator ® mixer. The composition was then cooled to 23 degrees Centigrade and maintained thereat for 72 hours.

Thereafter the composition was heated to 50 degrees Centigrade to reduce its viscosity and formed in a mold of two 8 inch by 8 inch glass plates with a one eighth inch gasket therebetween. The two glass plates were tightly clampled, and the resin heated in an oven to about 105 degrees Centigrade over a period of twenty hours.

Thereafter a sheet of rigid polymerizate was recovered. The polymerizate was clear and free of haze and bubbles.

EXAMPLE III

A resin of diethylene glycol bis(allyl carbonate) and a copolymer of allyl methacrylate and methyl methacrylate was prepared, and cured to yield a rigid polymer.

Two copolymers of allyl methacrylate and methyl methacrylate were prepared. Both were prepared by placing 5 grams of allyl methacrylate, 95 grams of methyl methacrylate, 300 milliliters of methylene chloride, and 1.0 gram of isopropyl peroxydicarbonate in a 28 ounce bottle. Each bottle was sealed and heated at 50 degrees Centigrade in a water bath for 18 hours. The bottles were then removed from the water bath, and the polymer recovered by vacuum drying. Thereafter, the molecular weight was determined by inherent viscosity in methylene chloride versus poly(methyl methacrylate), and was found to be in excess of 500,000.

The copolymers were ground in a mortar and pestle. The ground copolymers were added to 750 milliliters methylene chloride to provide 80 grams of poly(allyl methacrylate-methyl methacrylate) in 750 milliliters of methylene chloride. Three hundred twenty grams of PPG Industries, Inc. CR-39 ® brand diethylene glycol bis(allyl carbonate) was mixed with 9.6 grams of benzoyl peroxide. The bis(allyl carbonate)-benzoyl peroxide was added to the poly(allyl methacrylate-methyl methacrylate) in methylene chloride. The methylene chloride was then removed by rotary vacuum evaporation.

The resulting blend was a highly viscous composition containing 20 weight percent of a poly(allyl methacrylate-methyl methacrylate) copolymer containing approximately 5 weight allyl methacrylate, balance methyl methacrylate.

Thereafter the blend was heated to 50 degrees Centigrade to reduce its viscosity and formed in a mold of two 8 inch by 8 inch glass plates with a one eighth inch gasket therebetween. The two glass plates were tightly clamped and the resin heated in an oven to about 105 degrees Centigrade over a period of twenty hours.

Thereafter a sheet of rigid polymerizate was recovered. The polymerizate was clear and free of haze and bubbles.

While the invention has been described with respect to certain exemplifications and embodiments, such description is only illustrative, the scope of the invention being described by the claims appended hereto.

We claim:

1. A resin comprising a bis(allyl carbonate) monomer chosen from the group consisting of alkylene bis(allyl carbonate) monomers, alkylene ether bis(allyl carbonate) monomers, alkylene polyether bis(allyl carbonate) monomers, alkylene carbonate bis(allyl carbonate) monomers, and mixtures thereof; and a dispersed copolymer of (a) a monofunctional vinyl monomer, and (b) a difunctional monomer having vinyl and allyl functionality, said dispersed copolymer being swellable by or soluble in the monomer of the bis(allyl carbonate) and having a viscosity average molecular weight above 100,000, said resin being pseudoplastic, fusible, capable of being cured to a hard resin, and having a shear stress of $10^4$ to $10^7$ dynes per square centimeter at a shear rate of $10^1$ to $10^4$ per second.

2. The resin of claim 1 wherein the bis(allyl carbonate) monomer has the formula:

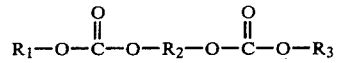

where $R_1$ and $R_3$ are allyl or substituted allyl groups,

3. The resin of claim 1 wherein $R_1$ and $R_3$ are independently represented by the formula:

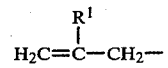

where $R^1$ may be hydrogen, a halogen, or a 1 to 4 carbon alkyl group.

4. A pseudoplastic composition of matter having a shear stress of $10^4$ to $10^7$ dynes per square centimeter at shear rates of $10^1$ to $10^4$ per second, comprising:
   (a) a first component chosen from the group consisting of alkylene bis(allyl carbonate) monomers, alkylene ether bis(allyl carbonate) monomers, alkylene polyether bis(allyl carbonate) monomers, alkylene carbonate bis(allyl carbonate) monomers, and mixtures thereof; and polymers thereof; and
   (b) as a second component, an unsaturated copolymerizate of (1) an ester of an allyl alcohol and an acrylic acid, and (2) a vinyl monomer, said copolymerizate having a viscosity average molecular weight above about 100,000.

5. The composition of claim 4 wherein the second component is a copolymerizate of (1) any ester of an allyl alcohol and an acrylic acid, and (2) a vinyl monomer chosen from the group consisting of (i) acrylic acids, and (ii) esters of acrylic acids with saturated alcohols.

6. A solid polymerizate comprising:
   (1) poly[diethylene glycol bis(allyl carbonate)], and
   (2) poly(allyl methacrylate-methyl methacrylate);
said solid polymerizate prepared from a composition of (1) diethylene glycol bis(allyl carbonate) monomer and (2) poly(allyl methacrylate-methyl methacrylate) having a viscosity average molecular weight above about 100,000.

7. A pseudoplastic composition having a shear stress of $10^4$ to $10^7$ dynes per square centimeter at a shear rate of $10^1$ to $10^4$ per second comprising:
   (1) diethylene glycol bis(allyl carbonate) monomer; and
   (2) poly(allyl methacrylate-methyl methacrylate) having a a viscosity average molecular weight above about 100,000.

* * * * *